United States Patent [19]

Toshio

[11] 4,453,429
[45] Jun. 12, 1984

[54] AUTOMATIC TRANSMISSION WITH OVERDRIVE DEVICE

[75] Inventor: Takano Toshio, Hamuramachi, Japan

[73] Assignee: Fuji Jukogyo Kabushiki Kaisha, Tokyo, Japan

[21] Appl. No.: 297,888

[22] Filed: Aug. 31, 1981

[30] Foreign Application Priority Data

Sep. 9, 1980 [JP] Japan .............................. 55-125435

[51] Int. Cl.³ .............................................. F16H 47/08
[52] U.S. Cl. ...................................................... 74/688
[58] Field of Search ................................... 74/687, 688

[56] References Cited

U.S. PATENT DOCUMENTS 4,224,837 9/1980 Croswhite .............................. 74/688
4,296,646 10/1981 Thornton ............................... 74/688

Primary Examiner—Kenneth Dorner
Assistant Examiner—Frank McKenzie
Attorney, Agent, or Firm—Martin A. Farber

[57] ABSTRACT

An automatic transmission having a torque converter comprising an impeller connected to the crankshaft of an internal combustion engine and a turbine driven by the impeller by oil, an automatic transmission apparatus comprising a planetary gear device and a fluid operated brake and clutch devices connected to an output shaft of the turbine, and a final reduction gear device connected to an output shaft of the automatic transmission apparatus. An overdrive device comprising an overdrive clutch and overdrive gears is connected to the output shaft of the turbine. An intermediate shaft is connected between an output shaft of the overdrive gears and the final reduction gear device, and a valve is provided for applying pressure oil to the overdrive clutch for engagement thereof.

15 Claims, 1 Drawing Figure

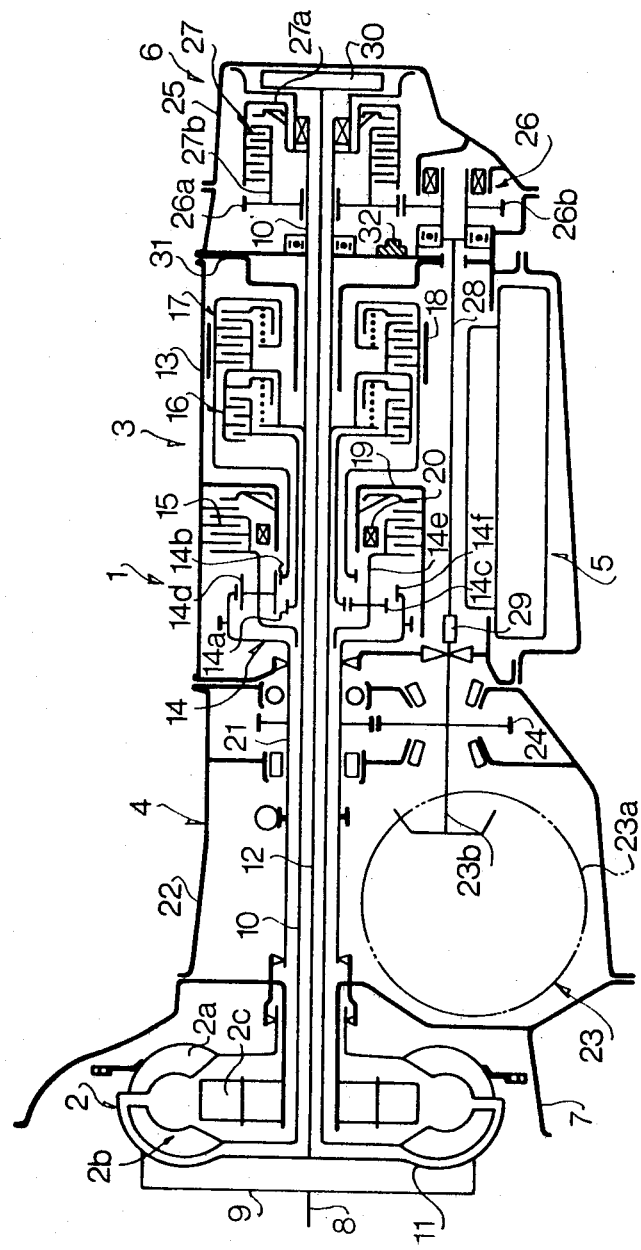

AUTOMATIC TRANSMISSION WITH OVERDRIVE DEVICE

BACKGROUND OF THE INVENTION

The present invention relates to an automatic transmission provided with the overdrive device of the type in which an torque converter, an aoutomatic transmission and a final reduction gear are integrally assembled.

In a conventional automatic transmission with an overdrive device, a planetary gear device is used for increasing the rotation speed of the output of the transmission. Particularly, in the three-speed change gear transmission, the power transmission flow is arranged on an axis. Because of such an arrangement, a pair of planetary gear devices must be provided, which further requires to provide at least two transmitting devices comprising a clutch, band and one-way clutch. Such a construction makes the appratus large and complicated, which also causes complication of the hydraulic control system.

SUMMARY OF THE INVENTION

Considering such drawbacks, it is an object of the present invention to provide an automatic transmission with an overdrive device in which an output shaft connected to a turbine of a torque converter is connected to an overdrive clutch of the overdrive device provided in the rear side of the automatic transmission, whereby transmission elements in the automatic transmission may also be used as elements for the overdrive device, thereby simplifying the construction and effecting other improvements.

The present invention will be more fully explained with reference to the accompanying drawings.

BRIEF DESCRIPTION OF DRAWINGS

The only FIGURE is a skelton drawing showing a preferred embodiment of the automatic transmission in accordance with the present invention.

DETAILED DESCRIPTION OF PREFFERRED EMBODIMENTS

In the FIGURE, a transaxle type transmission 1 is shown for driving front wheels, which comprises a torque converter 2, an automatic transmission device 3 for three speeds, a final reduction device 4 disposed between the automatic transmission apparatus 3 and the torque converter 2, a valve block 5 of a hydraulic control device provided in a lower part of the automatic transmission device 3, and an overdrive device 6 arranged in a rear part of the automatic transmission apparatus 3 opposite the torque converter 2.

The torque converter 2 is in a converter housing 7 and comprises a pump impeller 2a, a turbine 2b and a stator 2c. The pump impeller 2a is in direct connection with an engine crankshaft 8 by means of a drive plate 9. A turbine output shaft 10 extends from the turbine 2b and an oil pump drive shaft 12 extends from a converter cover 11 provided integrally with the drive plate 9. The pump impeller 2a is rotated by the engine by means of the crankshaft 8 to rotate the turbine 2b by the oil flow regulated by the stator 2c.

The automatic transmission apparatus 3 has a transmission case 13 in which a planetary gear 14 at its front part, and a low-and-reverse brake 15 at its rear part, a forward clutch 16, and a reverse clutch 17 are arranged in this order. The turbine shaft 10 which is connected to the turbine 2b of the torque converter 2 is connected to a forward sun gear 14a of the planetary gear 14 through the forward clutch 16, and at the same time is connected to a reverse sun gear 14b through the reverse clutch 17 to apply the output of the turbine shaft 10 thereto. Further, a brake band 18 is provided on the drum side of the reverse clutch 17 to lock the reverse sun gear 14b. In the panetary gear 14, a short pinion 14c engaging with the sun gear 14a and a long pinion 14d engaging with the sun gear 14b are supported in a carrier 14e which supports the low-and-reverse brake 15. The carrier is locked by a one-way clutch 20 provided between the low-and-reverse brake 15 and a center support 19. An output shaft 21 extends from a ring gear 14f the latter engaging with the long pinion 14d, to the torque converter.

The front-wheel final reduction device 4 has a case 22 secured between the convertor housing 7 and the transmission case 13. The case 22 contains a crown gear 23a of a differential mechanism 23 for front wheels of the vehicle and is disposed under units including the turbine shaft 10. The output shaft 21 is coupled with a drive pinion 23b by means of a reduction gear 24 for transmitting the power to the crown gear 23a.

Further, the valve block 5 of the hydraulic control device contains therein various valves and oil passages (not shown). The hydraulic control device is adapted to supply or discharge the pressure oil to or from a servo mechanism of the low-and-reverse brake 15 and the clutches 16, 17 and the brake band 18 of the automatic transmission apparatus 3 in accordance with the transmission pattern according to the relation between vehicle speed and engine load.

The overdrive device 6 of the present invention is provided within a transmission cover 25 which is fixed to the rear end of the transmission case 13. The turbine output shaft 10 extends into the transmission cover 25 to form an extension 10'. An overdrive gear device 26 and an overdrive clutch 27 are disposed on the extension 10'. The overdrive gear device 26 comprises a large drive gear 26a and a small driven gear 26b which engage each other. The drive gear 26a is freely rotatably mounted on the extension 10' and the driven gear 26b is secured to a rearward extension of the drive pinion 23b, so that a speed-up gear device is provided. An overdrive clutch 27, which is a hydraulic clutch type, comprises a drum 27a secured to the extension 10' and a hub 27b secured to the drive gear 26a, and is adapted to establish or cut off the connection of the turbine shaft 10 with the drive gear 26a. Further, the driven gear 26b is connected to the drive pinion 23b of the final reduction device 4 by means of an intermediate shaft 28 and a spline joint 29. An oil pump 30 is attached to the cover 25 and connected to the oil pump drive shaft 12.

A clutch support 31 is provided with a valve 32 for hanging the overdrive. The valve 32 is adapted to discharge the oil from the forward clutch 16 and to supply the oil to the overdrive clutch 27 to achieve the engagement when the vehicle reaches a condition suitable for overdriving.

Because of such construction of the present invention, when oil is discharged from the overdrive clutch 27, the overdrive gear device 26 is disengaged from the extension 10'. If the forward clutch 16 of the automatic transmission apparatus 3 is engaged, power from the engine crankshaft 8 is transmitted to the turbine output shaft 10 through the torque converter 2 and further to the forward sun gear 14a of the planetary gear 14 to establish a forward driving speed condition. When the carrier 14e is locked by the one-way clutch 20 or the low-and-reverse brake 15, the largest gear ratio transmission is provided. From the output shaft 21, of the automatic transmission apparatus the output is transmitted to the drive pinion 23b of the differential mechanism 23 through the reduction gear 24 and further to the front-wheels through the crown gear 23a to establish the 1st-speed driving condition. When the vehicle speed reaches a predetermined speed, the brake band 18 instead of the low-and-reverse brake 15 actuates to lock the reverse sun gear 14b. Thus, power transmission of a gear ratio smaller than the above-metioned 1st-speed, that is, the 2nd-speed driving condition is established. When the vehicle speed is further increased, the reverse clutch 17 instead of the brake band 18 is engaged. Accordingly, the planetary gear device is integrated and the turbine shaft 10 and the output shaft 21 are directly connected with each other to transfer the output from the turbine shaft 10 to the front wheels, as the 3rd-speed transmission.

If, as an example, during high speed driving in the 3rd-speed condition, when the overdrive clutch 27 is engaged after disengaging the forward clutch 16 of the automatic transmission apparatus 3 by the valve 32, the planetary gear 14 becomes incapable of automatic transmission operation because no power is applied to the forward sun gear 14a. On the contrary, the turbine shaft 10 is engaged with the overdrive gear device 26 as a result of the engagement of the overdrive clutch 27. Thus, power from the trubine shaft 10 is transmitted to the overdrive gear device 26 and the speed is increased by the drive and the driven gears 26a and 26b. The power from the intermediate shaft 28 of the driven gear 26b is transmitted to the front-wheels through the drive pinion 23b and crown gear 23a of the differential mechanism 23. Thus, the vehicle is over-driven through the overdrive gear device 26.

In this condition, the power transmitted to the turbine shaft 10 through the torque converter 2 is applied to the reverse sun gear 14b of the planetary gear 14 because of the engagement of the reverse clutch 17 during the 3rd-speed. The power transmitted to the drive pinion 23b of the differential mechanism 23 is reversely applied to the ring gear 14f of the planetary gear 14 through the reduction gear 24 and the output shaft 21. However, the carrier 14e is free to rotate, since the one-way clutch 20 and the low-and-reverse brake 15 are released. As a result, the planetary gear 14 idles without causing any effect.

Changing to the overdrive gear device 26 from the 1st-speed drive or the 2nd-speed drive may also be performed in the same way as above described. Operation in the reverse manner causes the overdrive condition to release and to effect the power transmission by means of the automatic transmission apparatus 3.

In accordance with the construction of the present invention, an overdrive gear device 26 is attached to the automatic transmission using a part of the transmission without changing the construction thereof. Accordingly, the automatic transmission with the overdrive device may be simplified in construction.

What is claimed is:

1. An automatic transmission comprising
    a torque converter comprising a converter cover and an impeller connected to the crankshaft of an internal combustion engine and a turbine driven by said impeller through oil,
    an automatic transmission apparatus comprising a planetary gear device and fluid operated brake and clutch devices operatively connected to an output shaft of said turbine,
    an oil pump drive shaft operatively connected to said converter cover and axially extending through said automatic transmission apparatus,
    means comprising an oil pump driven by said oil pump drive shaft for producing pressure oil to be applied to the fluid operated brake and clutch devices,
    a final reduction gear device connected to an output shaft of said automatic transmission appratus,
    an overdrive device comprising an overdrive clutch and overdrive gears, said overdrive clutch being connected between said output shaft of said turbine and said overdrive gears,
    an intermediate shaft connected between an output shaft of said overdrive gears and said final reduction gear device, and
    valve means for applying the pressure oil to said overdrive clutch for engagement thereof for overdriving and substantially simultaneously via one of said clutch devices for operatively disconnecting said output shaft of said turbine from said final reduction gear device via said automatic transmission apparatus and said planetary gear device.

2. The automatic transmission according to claim 1 wherein
    said overdrive device and said oil pump are mounted at a rear portion of said automatic transmission apparatus,
    said overdrive clutch is connected to a rear extension of said output shaft of said turbine.

3. The automatic transmission according to claim 1, wherein
    said overdrive device is provided in a rear portion of said automatic transmission apparatus.

4. The automatic transmission according to claim 1, wherein
    said one of said clutch devices is a forward clutch.

5. The automatic transmission according to claim 1, further comprising
    a spline joint which connects said intermediate shaft to said final reduction gear device.

6. The automatic transmission according to claim 1, wherein
    said overdrive gears comprise two peripherally engaging gears having parallel axes of rotation,
    one of said overdrive gears is coaxial to and mounted relatively rotatable to said oil pump drive shaft,
    the other of said overdrive gears is coaxial to said intermediate shaft and is connected to said output shaft of said overdrive gears.

7. The automatic transmission according to claim 2, wherein
    said automatic transmission apparatus is located between said overdrive device and said torque converter.

8. The automatic transmission according to claim 7, wherein
    said overdrive device is located between said oil pump and said automatic transmission apparatus.

9. The automatic transmission according to claim 7, further comprising a cover of said overdrive device is connected at the rear portion of said automatic transmission apparatus, said oil pump is mounted at a rear of said cover.

10. The automatic transmission according to claim 1, wherein
said torque converter, said automatic transmission apparatus and said overdrive device are axially aligned in the recited order.

11. The automatic transmission according to claim 1, wherein
said output shaft of said turbine is hollow,
said oil pump drive shaft is coaxially arranged inside of said output shaft of said turbine.

12. The automatic transmission according to claim 1, wherein
said output shaft of the turbine is secured to said turbine and extends passing through an axis of said automatic transmission apparatus so as to project rearwardly therefrom forming an extension connected to said overdrive clutch.

13. An automatic transmission comprising
a torque converter comprising a converter cover and an impeller connected to a crankshaft of an internal combustion engine and a turbine driven by said impeller by means of oil,
an automatic transmission apparatus comprising a planetary gear set and fluid operated brake and clutch devices operatively connected to an output shaft of said turbine,
an oil pump drive shaft operatively connected to said converter cover and axially extending through said automatic transmission apparatus,
means comprising an oil pump driven by said oil pump drive shaft for producing pressure oil to be applied to the fluid operated brake and clutch devices,
a final reduction gear device connected to an output shaft of said automatic transmission apparatus,
an intermediate shaft connected to said final reduction gear device,
an overdrive means comprising an overdrive clutch means and overdrive gears, the latter being separate and independent from said planetary gear set of said automatic transmission,
said overdrive clutch means upon actuation thereof for receiving the pressure oil from said oil pump and for releasably connecting said output shaft of said turbine to said intermediate shaft via said overdrive gears,
valve means for applying the pressure oil to said overdrive clutch means for actuation thereof for overdriving and substantially simultaneously via one of said clutch devices for operatively disconnecting said output shaft of said turbine from said final reduction gear device via said automatic transmission apparatus and said planetary gear set, and said valve means for releasing said overdrive clutch means and substantially simultaneously locking said one clutch device for normal operation of said automatic transmission apparatus.

14. The automatic transmission according to claim 13, wherein
said overdrive means and said oil pump are mounted at a rear portion of said automatic transmission apparatus.

15. The automatic transmission according to claim 13, wherein
said torque converter, said automatic transmission apparatus and said overdrive means are axially aligned in the recited order.

* * * * *